US009749617B2

(12) United States Patent
Allio et al.

(10) Patent No.: US 9,749,617 B2
(45) Date of Patent: Aug. 29, 2017

(54) METHOD OF AUTOSTEREOSCOPIC DISPLAY ON A SCREEN HAVING ITS LARGEST DIMENSION IN A VERTICAL DIRECTION

(75) Inventors: Pierre Allio, Paris (FR); Gilles Marcellier, Paris (FR); Nicolas Hirsch, Paris (FR)

(73) Assignee: ALIOSCOPY, Paris (FR)

( * ) Notice: Subject to any disclaimer, the term of this patent is extended or adjusted under 35 U.S.C. 154(b) by 544 days.

(21) Appl. No.: 13/560,345

(22) Filed: Jul. 27, 2012

(65) Prior Publication Data
US 2014/0029095 A1 Jan. 30, 2014

(30) Foreign Application Priority Data

Jul. 24, 2012 (FR) ...................... 12 57189

(51) Int. Cl.
*G02B 27/22* (2006.01)
*H04N 13/04* (2006.01)
(52) U.S. Cl.
CPC ....... *H04N 13/0404* (2013.01); *G02B 27/225* (2013.01); *G02B 27/2214* (2013.01); *H04N 13/0409* (2013.01); *H04N 13/0415* (2013.01); *H04N 13/0447* (2013.01); *H04N 13/0497* (2013.01)
(58) Field of Classification Search
CPC ............ G02B 27/2214; G02B 27/2264; H04N 13/0404; H04N 13/0409; H04N 13/0497
USPC ......... 359/462, 463, 464; 348/59, 56, 60, 51
See application file for complete search history.

(56) References Cited

U.S. PATENT DOCUMENTS

| 5,602,658 | A | * | 2/1997 | Ezra | ................... | H04N 13/0404 348/E13.029 |
|---|---|---|---|---|---|---|
| 5,936,607 | A | | 8/1999 | Allio | | |
| 6,972,744 | B1 | | 12/2005 | Allio | | |
| 7,969,463 | B2 | * | 6/2011 | Takaki | ............................. | 348/59 |
| 8,436,953 | B2 | * | 5/2013 | Sakamoto | .......... | G02B 27/2214 349/145 |

(Continued)

FOREIGN PATENT DOCUMENTS

| GB | 2 418 315 A | 3/2006 |
|---|---|---|
| WO | WO 94/26072 A1 | 11/1994 |
| WO | WO 00/10332 A1 | 2/2000 |

(Continued)

OTHER PUBLICATIONS

Preliminary Search Report for French Application No. 1257189 dated Apr. 24, 2013.

*Primary Examiner* — Audrey Y Chang
(74) *Attorney, Agent, or Firm* — Steven M. Greenberg, Esq.; CRGO Law

(57) ABSTRACT

A method for autostereoscopic display of an autostereoscopic image with N points of view of rank between 1 and N—in an ascending order from right to left—on a screen having pixels arranged in rows and in columns, said pixels consisting of a plurality of subpixels of different colors (R, G, B), wherein said screen is arranged with its largest dimension in the vertical direction so that the subpixels forming each pixel are arranged in said vertical direction, and each column of the screen is filled with blocks of at least three subpixels corresponding to a set of subpixels of one of the points of view of the image to be displayed, separated by blocks of one or more subpixels that are off or darkened.

11 Claims, 41 Drawing Sheets

(56) References Cited

U.S. PATENT DOCUMENTS

Figure 15:
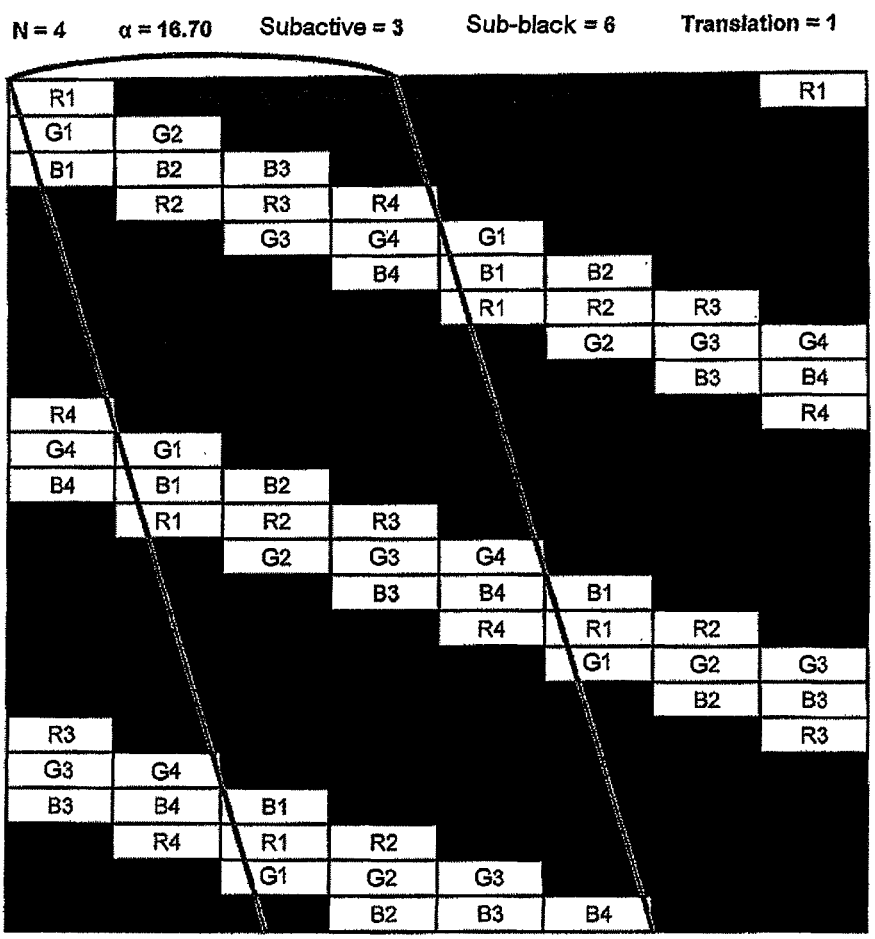

2008/0204455 A1     8/2008  Allio
2011/0157323 A1*    6/2011  Chen .................... G03B 35/18
                                                        348/51

FOREIGN PATENT DOCUMENTS

WO    WO 2006/024764 A1    3/2006
WO    WO 2012/073795 A1    6/2012

* cited by examiner

| N = 4 | α = 0 | Subactive = 1920 | Sub-black = 0 | Translation = 0 |

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |

Figure 1

| N = 4 | α = 18.43 | Subactive = 3 | Sub-black = 6 | Translation = 0 |

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |

| R4 | R1 | R2 | R3 | R4 | R1 | R2 | R3 |
|----|----|----|----|----|----|----|----|
| G4 | G1 | G2 | G3 | G4 | G1 | G2 | G3 |
| B4 | B1 | B2 | B3 | B4 | B1 | B2 | B3 |

| R3 | R4 | R1 | R2 | R3 | R4 | R1 | R2 |
|----|----|----|----|----|----|----|----|
| G3 | G4 | G1 | G2 | G3 | G4 | G1 | G2 |
| B3 | B4 | B1 | B2 | B3 | B4 | B1 | B2 |

Figure 2

N = 5   α = 18.43   Subactive = 3   Sub-black = 6   Translation = 0

| R1 | R2 | R3 | R4 | R5 | R1 | R2 | R3 |
|----|----|----|----|----|----|----|----|
| G1 | G2 | G3 | G4 | G5 | G1 | G2 | G3 |
| B1 | B2 | B3 | B4 | B5 | B1 | B2 | B3 |

| R5 | R1 | R2 | R3 | R4 | R5 | R1 | R2 |
|----|----|----|----|----|----|----|----|
| G5 | G1 | G2 | G3 | G4 | G5 | G1 | G2 |
| B5 | B1 | B2 | B3 | B4 | B5 | B1 | B2 |

| R4 | R5 | R1 | R2 | R3 | R4 | R5 | R1 |
|----|----|----|----|----|----|----|----|
| G4 | G5 | G1 | G2 | G3 | G4 | G5 | G1 |
| B4 | B5 | B1 | B2 | B3 | B4 | B5 | B1 |

Figure 3

N = 6    α = 18.43    Subactive = 3    Sub-black = 6    Translation = 0

| R1 | R2 | R3 | R4 | R5 | R6 | R1 | R2 |
|----|----|----|----|----|----|----|----|
| G1 | G2 | G3 | G4 | G5 | G6 | G1 | G2 |
| B1 | B2 | B3 | B4 | B5 | B6 | B1 | B2 |

| R6 | R1 | R2 | R3 | R4 | R5 | R6 | R1 |
|----|----|----|----|----|----|----|----|
| G6 | G1 | G2 | G3 | G4 | G5 | G6 | G1 |
| B6 | B1 | B2 | B3 | B4 | B5 | B6 | B1 |

| R5 | R6 | R1 | R2 | R3 | R4 | R5 | R6 |
|----|----|----|----|----|----|----|----|
| G5 | G6 | G1 | G2 | G3 | G4 | G5 | G6 |
| B5 | B6 | B1 | B2 | B3 | B4 | B5 | B6 |

Figure 4

| N = 4 | α = 20.56 | Subactive = 3 | Sub-black = 5 | Translation = 0 |

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |

| B4 | B1 | B2 | B3 | B4 | B1 | B2 | B3 |
|----|----|----|----|----|----|----|----|
| R4 | R1 | R2 | R3 | R4 | R1 | R2 | R3 |
| G4 | G1 | G2 | G3 | G4 | G1 | G2 | G3 |

| G3 | G4 | G1 | G2 | G3 | G4 | G1 | G2 |
|----|----|----|----|----|----|----|----|
| B3 | B4 | B1 | B2 | B3 | B4 | B1 | B2 |
| R3 | R4 | R1 | R2 | R3 | R4 | R1 | R2 |

Figure 5

N = 4    α = 16.70    Subactive = 3    Sub-black = 7    Translation = 0

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |

| G4 | G1 | G2 | G3 | G4 | G1 | G2 | G3 |
|----|----|----|----|----|----|----|----|
| B4 | B1 | B2 | B3 | B4 | B1 | B2 | B3 |
| R4 | R1 | R2 | R3 | R4 | R1 | R2 | R3 |

| B3 | B4 | B1 | B2 | B3 | B4 | B1 | B2 |
|----|----|----|----|----|----|----|----|
| R3 | R4 | R1 | R2 | R3 | R4 | R1 | R2 |
| G3 | G4 | G1 | G2 | G3 | G4 | G1 | G2 |

Figure 6

N = 4   α = 18.43   Subactive = 6   Sub-black = 3   Translation = 0

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
|    |    |    |    |    |    |    |    |
|    |    |    |    |    |    |    |    |
| R4 | R1 | R2 | R3 | R4 | R1 | R2 | R3 |
| G4 | G1 | G2 | G3 | G4 | G1 | G2 | G3 |
| B4 | B1 | B2 | B3 | B4 | B1 | B2 | B3 |
| R4 | R1 | R2 | R3 | R4 | R1 | R2 | R3 |
| G4 | G1 | G2 | G3 | G4 | G1 | G2 | G3 |
| B4 | B1 | B2 | B3 | B4 | B1 | B2 | B3 |
|    |    |    |    |    |    |    |    |
|    |    |    |    |    |    |    |    |
| R3 | R4 | R1 | R2 | R3 | R4 | R1 | R2 |
| G3 | G4 | G1 | G2 | G3 | G4 | G1 | G2 |
| B3 | B4 | B1 | B2 | B3 | B4 | B1 | B2 |
| R3 | R4 | R1 | R2 | R3 | R4 | R1 | R2 |
| G3 | G4 | G1 | G2 | G3 | G4 | G1 | G2 |
| B3 | B4 | B1 | B2 | B3 | B4 | B1 | B2 |

Figure 7

N = 4   α = 16.70   Subactive = 6   Sub-black = 4   Translation = 0

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
| G4 | G1 | G2 | G3 | G4 | G1 | G2 | G3 |
| B4 | B1 | B2 | B3 | B4 | B1 | B2 | B3 |
| R4 | R1 | R2 | R3 | R4 | R1 | R2 | R3 |
| G4 | G1 | G2 | G3 | G4 | G1 | G2 | G3 |
| B4 | B1 | B2 | B3 | B4 | B1 | B2 | B3 |
| R4 | R1 | R2 | R3 | R4 | R1 | R2 | R3 |
| B3 | B4 | B1 | B2 | B3 | B4 | B1 | B2 |
| R3 | R4 | R1 | R2 | R3 | R4 | R1 | R2 |
| G3 | G4 | G1 | G2 | G3 | G4 | G1 | G2 |
| B3 | B4 | B1 | B2 | B3 | B4 | B1 | B2 |

Figure 8

N = 4    α = 15.26    Subactive = 6    Sub-black = 5    Translation = 0

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |

| B4 | B1 | B2 | B3 | B4 | B1 | B2 | B3 |
|----|----|----|----|----|----|----|----|
| R4 | R1 | R2 | R3 | R4 | R1 | R2 | R3 |
| G4 | G1 | G2 | G3 | G4 | G1 | G2 | G3 |
| B4 | B1 | B2 | B3 | B4 | B1 | B2 | B3 |
| R4 | R1 | R2 | R3 | R4 | R1 | R2 | R3 |
| G4 | G1 | G2 | G3 | G4 | G1 | G2 | G3 |

| G3 | G4 | G1 | G2 | G3 | G4 | G1 | G2 |
|----|----|----|----|----|----|----|----|
| B3 | B4 | B1 | B2 | B3 | B4 | B1 | B2 |

Figure 9

| N = 4 | α = 14.04 | Subactive = 6 | Sub-black = 6 | Translation = 0 |

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |

| R4 | R1 | R2 | R3 | R4 | R1 | R2 | R3 |
|----|----|----|----|----|----|----|----|
| G4 | G1 | G2 | G3 | G4 | G1 | G2 | G3 |
| B4 | B1 | B2 | B3 | B4 | B1 | B2 | B3 |
| R4 | R1 | R2 | R3 | R4 | R1 | R2 | R3 |
| G4 | G1 | G2 | G3 | G4 | G1 | G2 | G3 |
| B4 | B1 | B2 | B3 | B4 | B1 | B2 | B3 |

Figure 10

N = 4    α = 18.43    Subactive = 8    Sub-black = 1    Translation = 0

| R1 | R2 | R3 | R4 | R1 | R2 | R3 | R4 |
|----|----|----|----|----|----|----|----|
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| B1 | B2 | B3 | B4 | B1 | B2 | B3 | B4 |
| R1 | R2 | R3 | R4 | R1 | R2 | R3 | R4 |
| G1 | G2 | G3 | G4 | G1 | G2 | G3 | G4 |
| R4 | R1 | R2 | R3 | R4 | R1 | R2 | R3 |
| G4 | G1 | G2 | G3 | G4 | G1 | G2 | G3 |
| B4 | B1 | B2 | B3 | B4 | B1 | B2 | B3 |
| R4 | R1 | R2 | R3 | R4 | R1 | R2 | R3 |
| G4 | G1 | G2 | G3 | G4 | G1 | G2 | G3 |
| B4 | B1 | B2 | B3 | B4 | B1 | B2 | B3 |
| R4 | R1 | R2 | R3 | R4 | R1 | R2 | R3 |
| G4 | G1 | G2 | G3 | G4 | G1 | G2 | G3 |
| R3 | R4 | R1 | R2 | R3 | R4 | R1 | R2 |
| G3 | G4 | G1 | G2 | G3 | G4 | G1 | G2 |
| B3 | B4 | B1 | B2 | B3 | B4 | B1 | B2 |
| R3 | R4 | R1 | R2 | R3 | R4 | R1 | R2 |
| G3 | G4 | G1 | G2 | G3 | G4 | G1 | G2 |
| B3 | B4 | B1 | B2 | B3 | B4 | B1 | B2 |

Figure 11

Figure 12

N = 4   α = 20.56   Subactive = 3   Sub-black = 4   Translation = 1

|   |   |   |   |   |   |   |   |   |
|---|---|---|---|---|---|---|---|---|
| R1 |    |    |    |    |    | R3 | R4 | R1 |
| G1 | G2 |    |    |    |    |    | G4 | G1 |
| B1 | B2 | B3 |    |    |    |    |    | B1 |
|    | R2 | R3 | R4 |    |    |    |    |    |
|    |    | G3 | G4 | G1 |    |    |    |    |
|    |    |    | B4 | B1 | B2 |    |    |    |
|    |    |    |    | R1 | R2 | R3 |    |    |
| G4 |    |    |    |    | G2 | G3 | G4 |    |
| B4 | B1 |    |    |    |    | B3 | B4 |    |
| R4 | R1 | R2 |    |    |    |    | R4 |    |
|    | G1 | G2 | G3 |    |    |    |    |    |
|    |    | B2 | B3 | B4 |    |    |    |    |
|    |    |    | R3 | R4 | R1 |    |    |    |
|    |    |    |    | G4 | G1 | G2 |    |    |
| B3 |    |    |    |    | B1 | B2 | B3 |    |
|    | R3 | R4 |    |    |    | R2 | R3 |    |
|    | G3 | G4 | G1 |    |    |    | G3 |    |
|    |    | B4 | B1 | B2 |    |    |    |    |
|    |    |    | R1 | R2 | R3 |    |    |    |
|    |    |    |    | G2 | G3 | G4 |    |    |
|    |    |    |    |    | B3 | B4 | B1 |    |
| R2 |    |    |    |    |    | R4 | R1 | R2 |
| G2 | G3 |    |    |    |    |    | G1 | G2 |
| B2 | B3 | B4 |    |    |    |    |    | B2 |

Figure 13

N = 4   α = 15.26   Subactive = 6   Sub-black = 4   Translation = 1

| R1 |    |    |    |    | R3 | R4 | R1 |
|----|----|----|----|----|----|----|----|
| G1 | G2 |    |    |    |    | G4 | G1 |
| B1 | B2 | B3 |    |    |    |    | B1 |
| R1 | R2 | R3 | R4 |    |    |    |    |
| G1 | G2 | G3 | G4 | G1 |    |    |    |
| B1 | B2 | B3 | B4 | B1 | B2 |    |    |
|    | R2 | R3 | R4 | R1 | R2 | R3 |    |
|    |    | G3 | G4 | G1 | G2 | G3 | G4 |
|    |    |    | B4 | B1 | B2 | B3 | B4 |
|    |    |    |    | R1 | R2 | R3 | R4 |
| G4 |    |    |    |    | G2 | G3 | G4 |
| B4 | B1 |    |    |    |    | B3 | B4 |
| R4 | R1 | R2 |    |    |    |    | R4 |
| G4 | G1 | G2 | G3 |    |    |    |    |
| B4 | B1 | B2 | B3 | B4 |    |    |    |
| R4 | R1 | R2 | R3 | R4 | R1 |    |    |
|    | G1 | G2 | G3 | G4 | G1 | G2 |    |
|    |    | B2 | B3 | B4 | B1 | B2 | B3 |
|    |    |    | R3 | R4 | R1 | R2 | R3 |
|    |    |    |    | G4 | G1 | G2 | G3 |
| B3 |    |    |    |    | B1 | B2 | B3 |
| R3 | R4 |    |    |    |    | R2 | R3 |
| G3 | G4 | G1 |    |    |    |    | G3 |
| B3 | B4 | B1 | B2 |    |    |    |    |

Figure 14

| N = 4 | α = 10.61 | Subactive = 9 | Sub-black = 6 | Translation = 1 |

| R1 | | | | | | | R1 |
|----|----|----|----|----|----|----|----|
| G1 | G2 | | | | | | |
| B1 | B2 | B3 | | | | | |
| R1 | R2 | R3 | R4 | | | | |
| G1 | G2 | G3 | G4 | G1 | | | |
| B1 | B2 | B3 | B4 | B1 | B2 | | |
| R1 | R2 | R3 | R4 | R1 | R2 | R3 | |
| G1 | G2 | G3 | G4 | G1 | G2 | G3 | G4 |
| B1 | B2 | B3 | B4 | B1 | B2 | B3 | B4 |
| | R2 | R3 | R4 | R1 | R2 | R3 | R4 |
| | | G3 | G4 | G1 | G2 | G3 | G4 |
| | | | B4 | B1 | B2 | B3 | B4 |
| | | | | R1 | R2 | R3 | R4 |
| | | | | | G2 | G3 | G4 |
| | | | | | | B3 | B4 |
| R4 | | | | | | | R4 |
| G4 | G1 | | | | | | |
| B4 | B1 | B2 | | | | | |
| R4 | R1 | R2 | R3 | | | | |
| G4 | G1 | G2 | G3 | G4 | | | |
| B4 | B1 | B2 | B3 | B4 | B1 | | |
| R4 | R1 | R2 | R3 | R4 | R1 | R2 | |
| G4 | G1 | G2 | G3 | G4 | G1 | G2 | G3 |
| B4 | B1 | B2 | B3 | B4 | B1 | B2 | B3 |

Figure 16

N = 4   α = 12.09   Subactive = 9   Sub-black = 3   Translation = 2

| R1 |    |    | R4 | R1 | R2 | R3 | R4 |    |
|----|----|----|----|----|----|----|----|----|
| G1 |    |    |    | G1 | G2 | G3 | G4 |    |
| B1 | B2 |    |    | B1 | B2 | B3 | B4 | B1 |
| R1 | R2 |    |    |    | R2 | R3 | R4 | R1 |
| G1 | G2 | G3 |    |    | G2 | G3 | G4 | G1 |
| B1 | B2 | B3 |    |    |    | B3 | B4 | B1 |
| R1 | R2 | R3 | R4 |    |    | R3 | R4 | R1 |
| G1 | G2 | G3 | G4 |    |    |    | G4 | G1 |
| B1 | B2 | B3 | B4 | B1 |    |    | B4 | B1 |
|    | R2 | R3 | R4 | R1 |    |    |    | R1 |
|    | G2 | G3 | G4 | G1 | G2 |    |    | G1 |
|    |    | B3 | B4 | B1 | B2 |    |    |    |
| R4 |    | R3 | R4 | R1 | R2 | R3 |    |    |
| G4 |    |    | G4 | G1 | G2 | G3 |    |    |
| B4 | B1 |    | B4 | B1 | B2 | B3 | B4 |    |
| R4 | R1 |    |    | R1 | R2 | R3 | R4 |    |
| G4 | G1 | G2 |    | G1 | G2 | G3 | G4 |    |
| B4 | B1 | B2 |    |    | B2 | B3 | B4 |    |
| R4 | R1 | R2 | R3 |    | R2 | R3 | R4 |    |
| G4 | G1 | G2 | G3 |    |    | G3 | G4 |    |
| B4 | B1 | B2 | B3 | B4 |    | B3 | B4 |    |
|    | R1 | R2 | R3 | R4 |    |    | R4 |    |
|    | G1 | G2 | G3 | G4 | G1 |    | G4 |    |
|    |    | B2 | B3 | B4 | B1 |    |    |    |

| N = 4 | α = 11.31 | Subactive = 9 | Sub-black = 3 | Translation = 3 |

| R1 |    | R4 | R1 | R2 |    | R1 | R2 |
|----|----|----|----|----|----|----|----|
| G1 |    | G4 | G1 | G2 |    | G1 | G2 |
| B1 |    | B4 | B1 | B2 |    | B1 | B2 |
| R1 | R2 |    | R1 | R2 | R3 |    | R2 |
| G1 | G2 |    | G1 | G2 | G3 |    | G2 |
| B1 | B2 |    | B1 | B2 | B3 |    | B2 |
| R1 | R2 | R3 |    | R2 | R3 | R4 |    |
| G1 | G2 | G3 |    | G2 | G3 | G4 |    |
| B1 | B2 | B3 |    | B2 | B3 | B4 |    |
|    | R2 | R3 | R4 |    | R3 | R4 | R1 |
|    | G2 | G3 | G4 |    | G3 | G4 | G1 |
|    | B2 | B3 | B4 |    | B3 | B4 | B1 |
| R4 |    | R3 | R4 | R1 |    | R4 | R1 |
| G4 |    | G3 | G4 | G1 |    | G4 | G1 |
| B4 |    | B3 | B4 | B1 |    | B4 | B1 |
| R4 | R1 |    | R4 | R1 | R2 |    | R1 |
| G4 | G1 |    | G4 | G1 | G2 |    | G1 |
| B4 | B1 |    | B4 | B1 | B2 |    | B1 |
| R4 | R1 | R2 |    | R1 | R2 | R3 |    |
| G4 | G1 | G2 |    | G1 | G2 | G3 |    |
| B4 | B1 | B2 |    | B1 | B2 | B3 |    |
|    | R1 | R2 | R3 |    | R2 | R3 | R4 |
|    | G1 | G2 | G3 |    | G2 | G3 | G4 |
|    | B1 | B2 | B3 |    | B2 | B3 | B4 |

Figure 23

N = 4   α = 14.04   Subactive = 6   Sub-black = 3   Translation = 3

| R1 | | R4 | R1 | | R4 | R1 | |
| G1 | | G4 | G1 | | G4 | G1 | |
| B1 | | B4 | B1 | | B4 | B1 | |
| R1 | R2 | | R1 | R2 | | R1 | R2 |
| G1 | G2 | | G1 | G2 | | G1 | G2 |
| B1 | B2 | | B1 | B2 | | B1 | B2 |
| | R2 | R3 | | R2 | R3 | | R2 |
| | G2 | G3 | | G2 | G3 | | G2 |
| | B2 | B3 | | B2 | B3 | | B2 |
| R4 | | R3 | R4 | | R3 | R4 | |
| G4 | | G3 | G4 | | G3 | G4 | |
| B4 | | B3 | B4 | | B3 | B4 | |
| R4 | R1 | | R4 | R1 | | R4 | R1 |
| G4 | G1 | | G4 | G1 | | G4 | G1 |
| B4 | B1 | | B4 | B1 | | B4 | B1 |
| | R1 | R2 | | R1 | R2 | | R1 |
| | G1 | G2 | | G1 | G2 | | G1 |
| | B1 | B2 | | B1 | B2 | | B1 |
| R3 | | R2 | R3 | | R2 | R3 | |
| G3 | | G2 | G3 | | G2 | G3 | |
| B3 | | B2 | B3 | | B2 | B3 | |
| R3 | R4 | | R3 | R4 | | R3 | R4 |
| G3 | G4 | | G3 | G4 | | G3 | G4 |
| B3 | B4 | | B3 | B4 | | B3 | B4 |

Figure 24

N = 4    α = 18.43    Subactive = 3    Sub-black = 3    Translation = 3

Figure 25

N = 4    α = 12.99    Subactive = 6    Sub-black = 3    Translation = 4

| R1 | R3 | R4 |    | R3 |    | R2 |    |
|----|----|----|----|----|----|----|----|
| G1 |    | G4 |    | G3 |    | G2 | G3 |
| B1 |    | B4 |    | B3 | B4 | B2 | B3 |
| R1 |    | R4 | R1 | R3 | R4 |    | R3 |
| G1 | G2 | G4 | G1 |    | G4 |    | G3 |
| B1 | B2 |    | B1 |    | B4 |    | B3 |
|    | R2 |    | R1 |    | R4 | R1 | R3 |
|    | G2 |    | G1 | G2 | G4 | G1 |    |
|    | B2 | B3 | B1 | B2 |    | B1 |    |
| R4 | R2 | R3 |    | R2 |    | R1 |    |
| G4 |    | G3 |    | G2 |    | G1 | G2 |
| B4 |    | B3 |    | B2 | B3 | B1 | B2 |
| R4 |    | R3 | R4 | R2 | R3 |    | R2 |
| G4 | G1 | G3 | G4 |    | G3 |    | G2 |
| B4 | B1 |    | B4 |    | B3 |    | B2 |
|    | R1 |    | R4 |    | R3 | R4 | R2 |
|    | G1 |    | G4 | G1 | G3 | G4 |    |
|    | B1 | B2 | B4 | B1 |    | B4 |    |
| R3 | R1 | R2 |    | R1 |    | R4 |    |
| G3 |    | G2 |    | G1 |    | G4 | G1 |
| B3 |    | B2 |    | B1 | B2 | B4 | B1 |
| R3 |    | R2 | R3 | R1 | R2 |    | R1 |
| G3 | G4 | G2 | G3 |    | G2 |    | G1 |
| B3 | B4 |    | B3 |    | B2 |    | B1 |

N = 4   α = 14.04   Subactive = 3   Sub-black = 3   Translation = 6

| R1 | R3 | R1 | R3 | R1 | R3 | R1 | R3 |
|----|----|----|----|----|----|----|----|
| G1 | G3 | G1 | G3 | G1 | G3 | G1 | G3 |
| B1 | B3 | B1 | B3 | B1 | B3 | B1 | B3 |

| R4 | R2 | R4 | R2 | R4 | R2 | R4 | R2 |
|----|----|----|----|----|----|----|----|
| G4 | G2 | G4 | G2 | G4 | G2 | G4 | G2 |
| B4 | B2 | B4 | B2 | B4 | B2 | B4 | B2 |

| R3 | R1 | R3 | R1 | R3 | R1 | R3 | R1 |
|----|----|----|----|----|----|----|----|
| G3 | G1 | G3 | G1 | G3 | G1 | G3 | G1 |
| B3 | B1 | B3 | B1 | B3 | B1 | B3 | B1 |

| R2 | R4 | R2 | R4 | R2 | R4 | R2 | R4 |
|----|----|----|----|----|----|----|----|
| G2 | G4 | G2 | G4 | G2 | G4 | G2 | G4 |
| B2 | B4 | B2 | B4 | B2 | B4 | B2 | B4 |

Figure 35

N = 4    α = 10.00    Subactive = 8    Sub-black = 2    Translation = 7

| R1 | R3 | R1 |    | R4 | R2 |    | R1 |
|----|----|----|----|----|----|----|----|
| G1 | G3 | G1 | G2 | G4 | G2 |    | G1 |
| B1 | B3 |    | B2 | B4 | B2 | B3 | B1 |
| R1 | R3 |    | R2 | R4 |    | R3 | R1 |
| G1 | G3 | G4 | G2 | G4 |    | G3 | G1 |
| B1 |    | B4 | B2 | B4 | B1 | B3 | B1 |
| R1 |    | R4 | R2 |    | R1 | R3 | R1 |
| G1 | G2 | G4 | G2 |    | G1 | G3 |    |
|    | B2 | B4 | B2 | B3 | B1 | B3 |    |
|    | R2 | R4 |    | R3 | R1 | R3 | R4 |
| G4 | G2 | G4 |    | G3 | G1 |    | G4 |
| B4 | B2 | B4 | B1 | B3 | B1 |    | B4 |
| R4 | R2 |    | R1 | R3 | R1 | R2 | R4 |
| G4 | G2 |    | G1 | G3 |    | G2 | G4 |
| B4 | B2 | B3 | B1 | B3 |    | B2 | B4 |
| R4 |    | R3 | R1 | R3 | R4 | R2 | R4 |
| G4 |    | G3 | G1 |    | G4 | G2 | G4 |
| B4 | B1 | B3 | B1 |    | B4 | B2 |    |
|    | R1 | R3 | R1 | R2 | R4 | R2 |    |
|    | G1 | G3 |    | G2 | G4 | G2 | G3 |
| B3 | B1 | B3 |    | B2 | B4 |    | B3 |
| R3 | R1 | R3 | R4 | R2 | R4 |    | R3 |
| G3 | G1 |    | G4 | G2 | G4 | G1 | G3 |
| B3 | B1 |    | B4 | B2 |    | B1 | B3 |

Figure 36

| N = 4 | | α = 10.61 | | Subactive = 6 | | Sub-black = 2 | | Translation = 8 | |
|---|---|---|---|---|---|---|---|---|---|
| R1 | R3 | R1 | R3 | R1 | R3 | R1 | R3 |
| G1 | G3 | G1 | G3 | G1 | G3 | G1 | G3 |
| B1 | B3 | B1 | B3 | B1 | B3 | B1 | B3 |
| R1 | R3 | R1 | R3 | R1 | R3 | R1 | R3 |
| G1 | G3 | G1 | G3 | G1 | G3 | G1 | G3 |
| B1 | B3 | B1 | B3 | B1 | B3 | B1 | B3 |
| | | | | | | | |
| B4 | B2 | B4 | B2 | B4 | B2 | B4 | B2 |
| R4 | R2 | R4 | R2 | R4 | R2 | R4 | R2 |
| G4 | G2 | G4 | G2 | G4 | G2 | G4 | G2 |
| B4 | B2 | B4 | B2 | B4 | B2 | B4 | B2 |
| R4 | R2 | R4 | R2 | R4 | R2 | R4 | R2 |
| G4 | G2 | G4 | G2 | G4 | G2 | G4 | G2 |
| | | | | | | | |
| G3 | G1 | G3 | G1 | G3 | G1 | G3 | G1 |
| B3 | B1 | B3 | B1 | B3 | B1 | B3 | B1 |
| R3 | R1 | R3 | R1 | R3 | R1 | R3 | R1 |
| G3 | G1 | G3 | G1 | G3 | G1 | G3 | G1 |
| B3 | B1 | B3 | B1 | B3 | B1 | B3 | B1 |
| R3 | R1 | R3 | R1 | R3 | R1 | R3 | R1 |

METHOD OF AUTOSTEREOSCOPIC DISPLAY ON A SCREEN HAVING ITS LARGEST DIMENSION IN A VERTICAL DIRECTION

The subject of the present invention is a method for display of autostereoscopic images on a screen arranged with its largest dimension in the vertical direction, that is to say a conventional screen rotated through 90°.

Autostereoscopy is a technique allowing for the display of images in relief without requiring the viewers to wear special glasses. This technique is known itself, in particular from the documents WO 94/26072, WO 00/10332 and WO 2006/024764 filed by the present inventor.

An autostereoscopic image consists of a plurality of interleaved "individual" images, corresponding to views of the same object or a same scene from different points of view. A selector device, typically consisting of an array of cylindrical lenses or a parallax barrier in front of the display screen. Generally, in order to avoid the appearance of certain artifacts, the cylindrical lenses have an axis inclined by approximately 18° relative to the direction of the columns of pixels of the screen.

The vertical screens (portrait format) are an asset for advertizing applications for points of sale (PLV), because space is at a premium, the desired display surfaces have to be large and some subjects do not lend themselves to the conventional horizontal format. Drinks or scents (bottles and flasks), hairdressing and beauty products (portraits of models), fashion (verticality of the body), etc., are naturally better highlighted with this format.

The vertical screens are in fact generally horizontal screens rotated by 90°. Now, the structure of most screens is non-symmetrical, or anisotropic, which makes the implementation of autostereoscopy problematic on rotated, or vertical, screens.

This is because the pixel (picture element) is not a simple structure. On most screens, it consists of three complex subparts, the subpixels, each responsible for one of the three basic colors (red, green or blue). Some screens have more than three colors, but the principle remains the same. Constructed, in their simplest form, from small rectangles three times larger vertically than horizontally, the subpixels form, together and juxtaposed horizontally, a square pixel.

When a screen is rotated by 90°, the rotation of the subpixels modifies the appearance of the pixel which is now formed from a square consisting of three rectangles of superposed color. Thus, the smallest entity that can be displayed in this context, taken horizontally (the axis of the eyes), is no longer the subpixel (colored component, red R, green G or blue B), but an entire pixel which is three times wider. The space between two horizontally contiguous pixels (forming, before rotation of the screen, the line spacing), often colored black to enhance the contrast of the image, now has to be taken into account, contributing to the overall density. It is not significant enough to allow for the use of optical components (lens array, parallax array) in the transformation of the flat screen into a relief screen without a loss of separating power.

The lens array or the parallax barrier, or any other equivalent selector system (hereinbelow, the "optical component") has to be considered as a row which must link together subpixels belonging to one and the same point of view but to different rows and columns of the screen, over the entire height of the image, while avoiding, as far as possible, the neighboring pixels belonging to the other points of view. For a given number of points of view, if the optical component has to conform to a pixel three times wider, then its pitch becomes three times greater. Such is the case of an optical array arranged vertically with points of view represented by entire columns, vertical and one pixel wide for the entire height of the image. The structure of the image seen through the optical component is not very pleasing, with particularly unpleasant outlines that look like staircases.

In this context, the enlargement of the pixels and its component subpixels through vertical lenses, three times larger, makes them highly visible and the whole is not of good quality.

These considerations remain valid when the subpixels have a more complex form (ellipse, chevron, etc.), provided that the subpixels of one and the same pixel are arranged side by side when the screen is oriented with its larger dimension in the horizontal direction (landscape format).

The invention aims to resolve this problem and to allow for an autostereoscopic display of better visual quality on a vertical screen, or in portrait format. In accordance with the invention, this result is achieved by switching off (or considerably darkening—at least by a factor of 10) certain subpixels of the screen.

Thus, one subject of the invention is a method for autostereoscopic display of an autostereoscopic image with N points of view of rank between 1 and N—in an ascending order from left to right—on a screen having pixels arranged in rows and in columns, said pixels consisting of a plurality of subpixels of different colors (R, G, B), wherein said screen is arranged with its largest dimension in the vertical direction so that the subpixels forming each pixel are arranged in said vertical direction, and each column of the screen is filled with blocks of at least three subpixels corresponding to a set of subpixels of one of the points of view of the image to be displayed, separated by blocks of one or more subpixels that are off or darkened.

According to different embodiments of the invention:

said points of view can be displayed in an ascending order—modulo N—in the direction of the rows, starting from the left of the screen, and in a descending order—modulo N—in the direction of the columns, starting from the top of the screen;

each said block of subpixels, corresponding to a set of subpixels of one of the points of view of the image to be displayed, may comprise either three, or at least six subpixels; the number of subpixels depends on the angle formed by the optical component with the column of subpixels. The closer the angle is to the vertical, the greater the number of subpixels having to code for an equivalent set originating from one of the points of view. The limit is reached when the optical component is parallel to the columns, in which case the set of the subpixels is the column itself. This last case is not taken into account in this application.

A vertical offset of said blocks of one or more subpixels that are off or darkened may be introduced between two adjacent columns of said screen.

Said vertical offset may vary, according to a periodical pattern, from one pair of adjacent columns to another.

Figure 21:
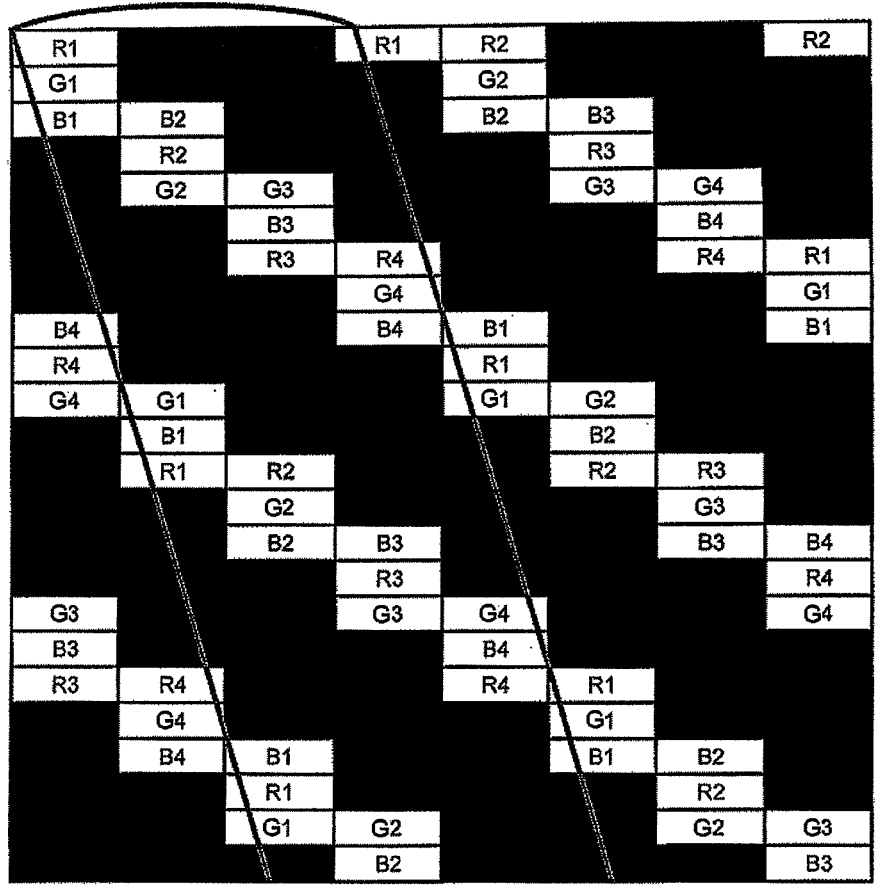
Figure 22:
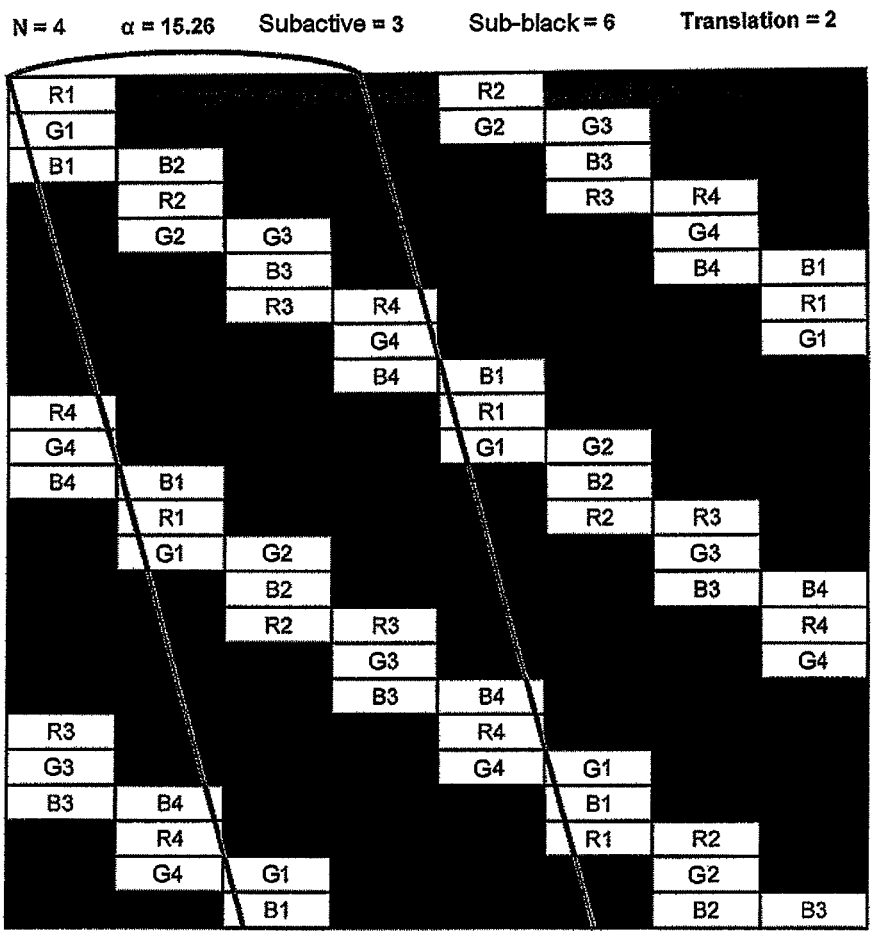
Figure 26:
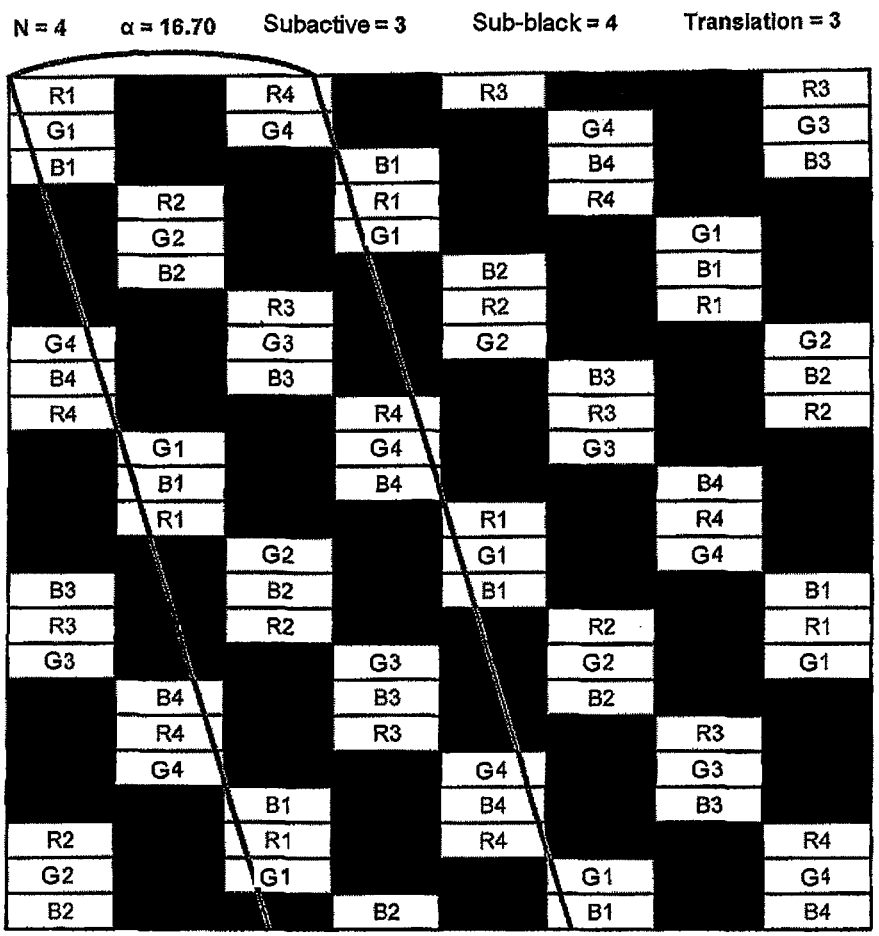
Figure 27:
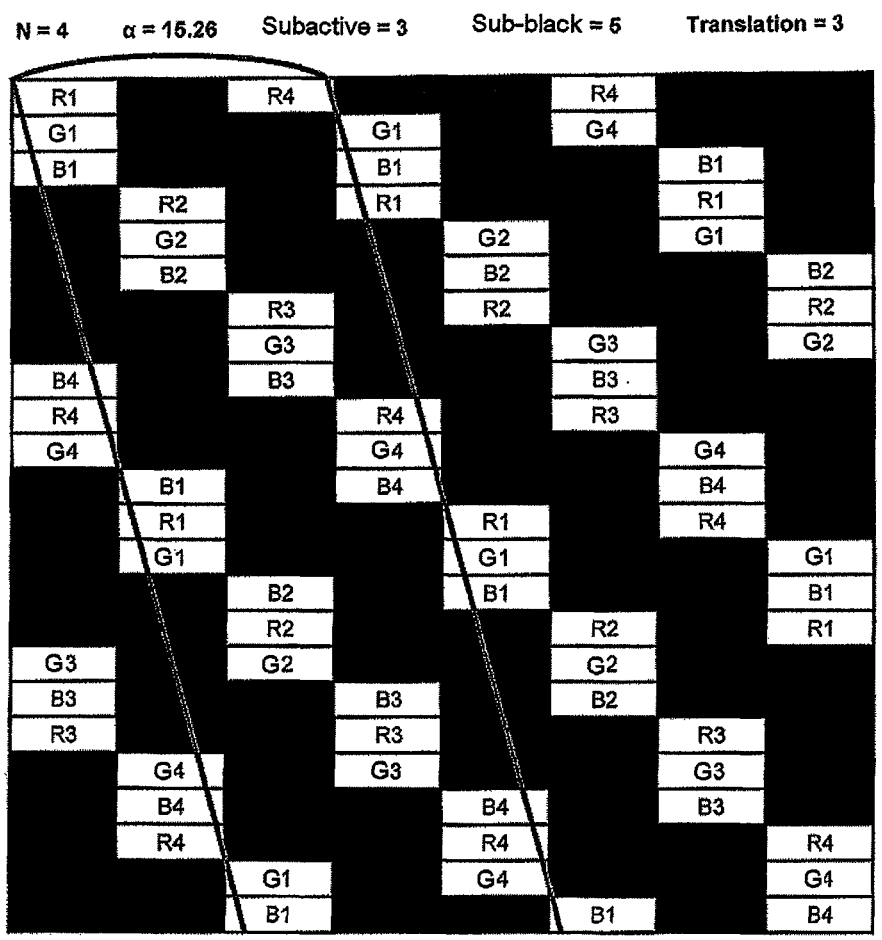
Figure 28:
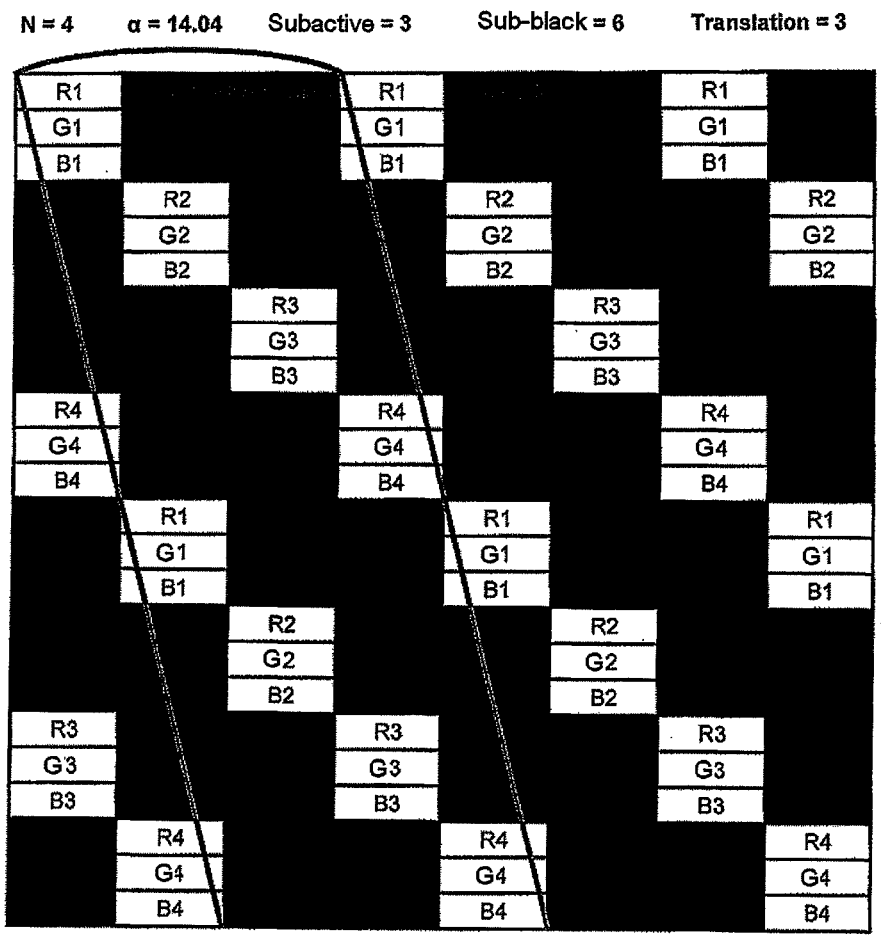
Figure 29:
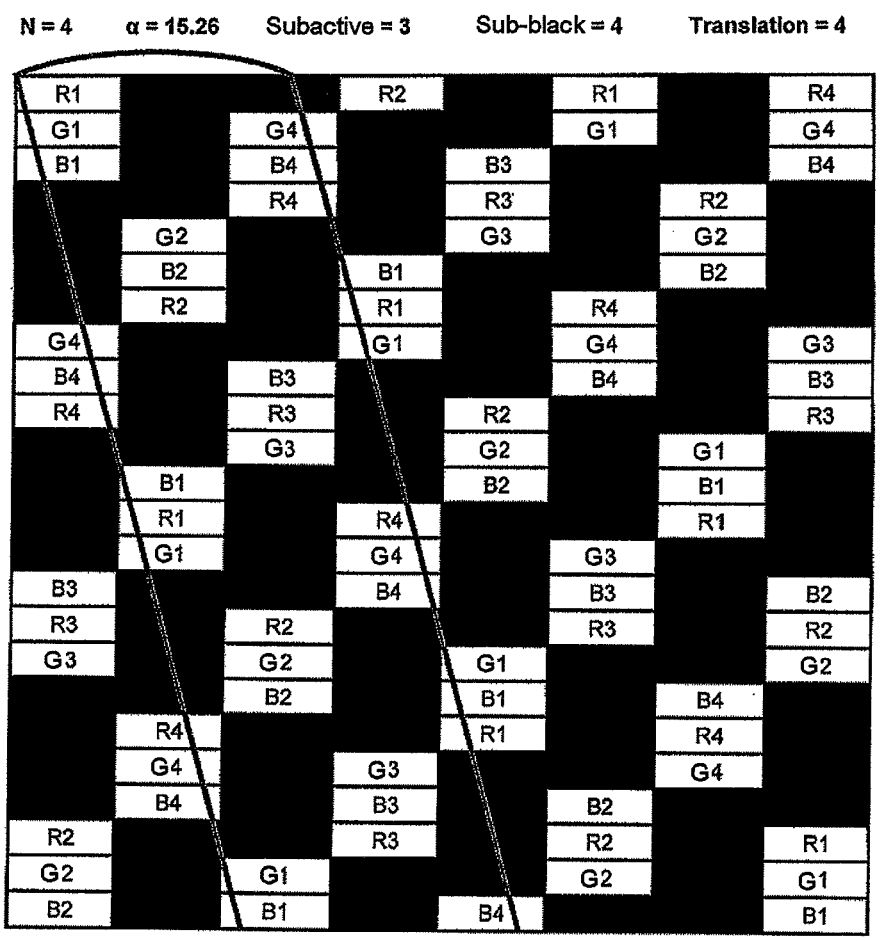
Figure 30:
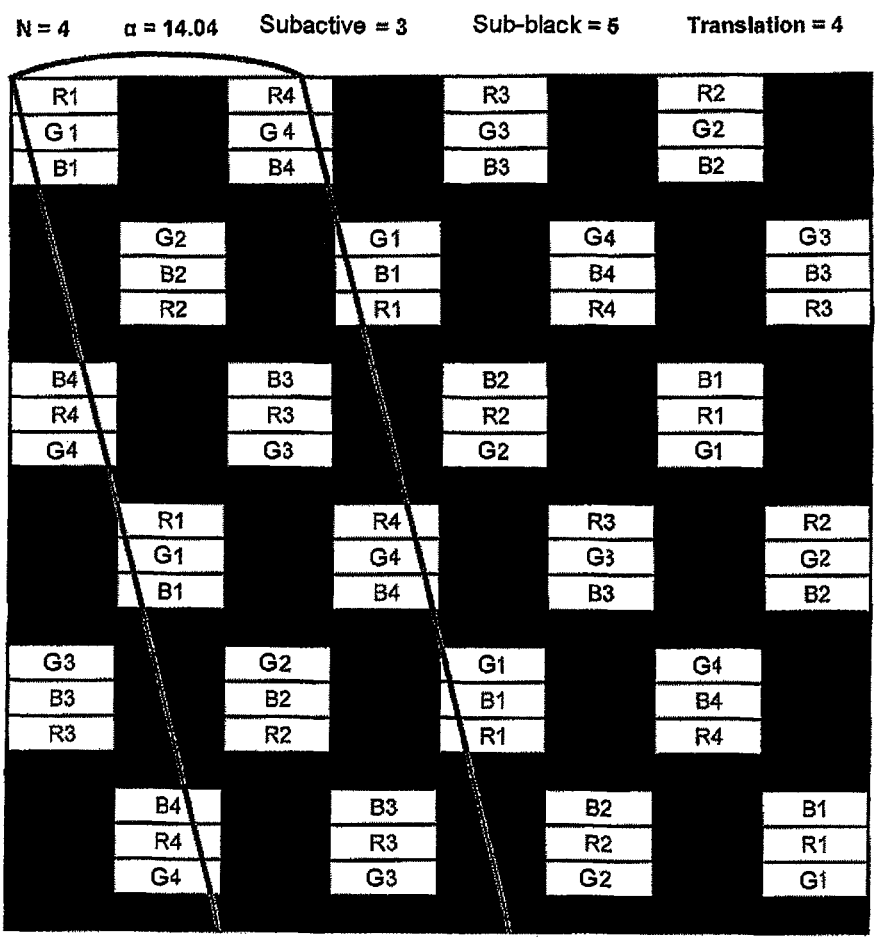

Other features, details and advantages of the invention will emerge on reading the description given with reference to the appended drawings, given by way of example and which illustrate, respectively:

FIG. 1, an autostereoscopic display method which does not belong to the invention;

FIGS. 2 to 11, different variants of a first embodiment of the invention;

FIGS. 12 to 37, different variants of a second embodiment of the invention; and

Figure 38:
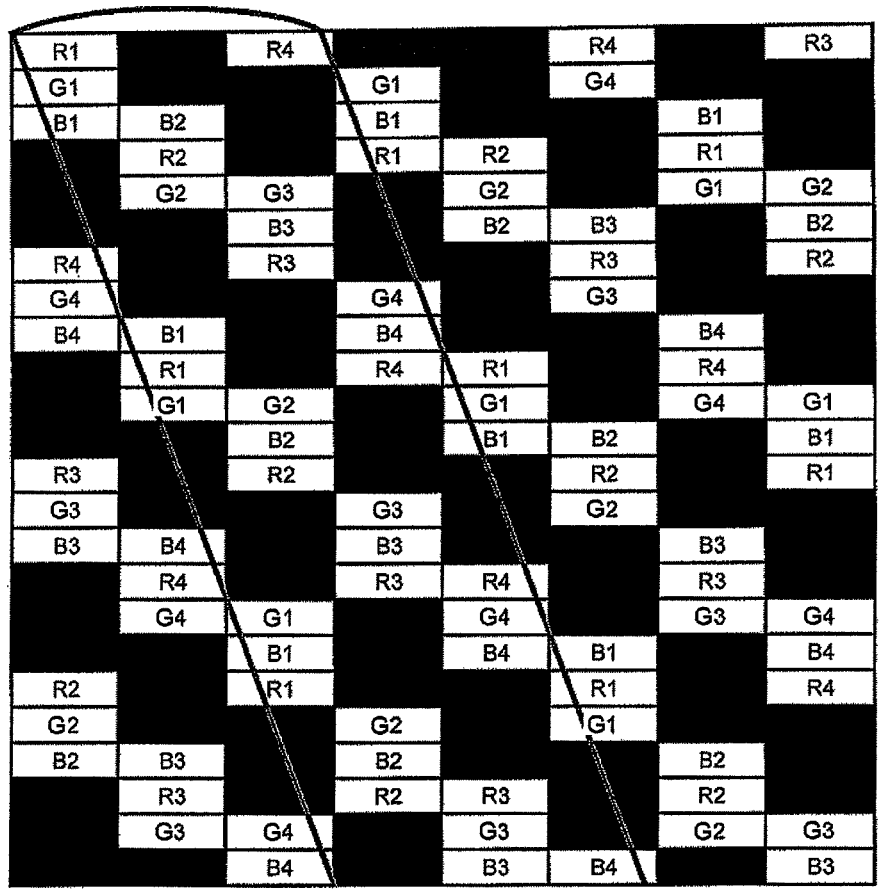
Figure 39:
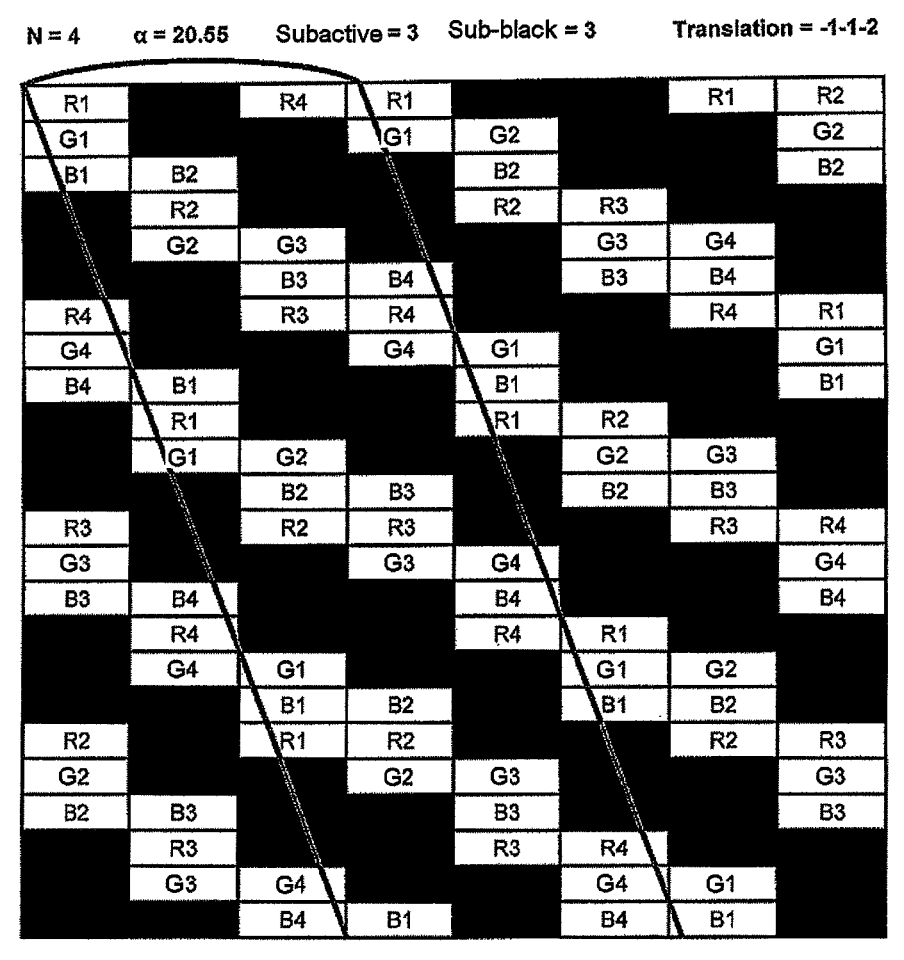
Figure 40:
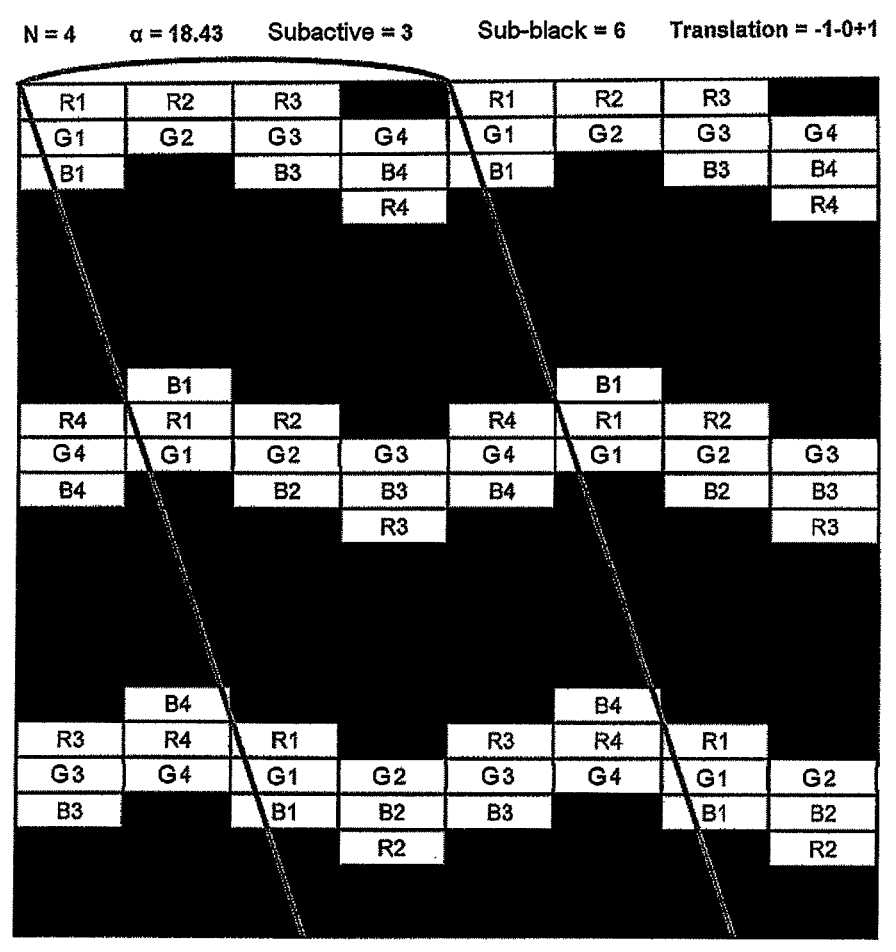
Figure 41:
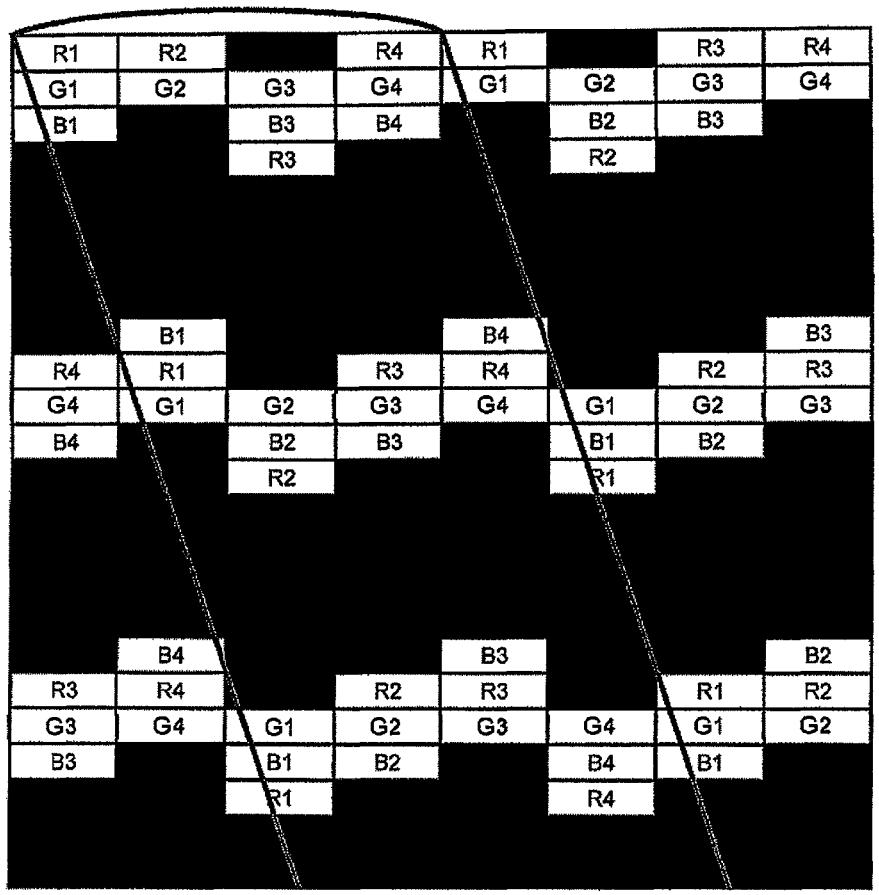

FIGS. 38 to 41, different variants of a third embodiment of the invention.

In the figures, Cn—with C=R, G or B and n an integer between 1 and N—denotes a subpixel of color "C", corresponding to the nth point of view. Thus, for example, R4 is a red subpixel of the $4^{th}$ point of view.

The first column of the screen (corresponding, before rotation, to a row) is considered, beginning, by convention, top left. A first set of $M_A$ contiguous subpixels ($M_A$ being a number greater than or equal to 3, the value of which depends on the variant embodiment considered) of said column, corresponds to the first set of homologous subpixels of the first point of view. In the group of $M_A$ subpixels, the sequence RGB is repeated one or more times (with incomplete repetitions if $M_A$ is not an integer multiple of 3).

The optical component is oblique: the generatrices of each cylindrical lens form, with the columns of the screen, an angle α (conventionally usually defined by working from top left to bottom right; the other direction is equally valid and depends only on the direction in which the images are mixed at the outset). Each lens can, at best, cross the first column only once. The same applies for all the lenses of the lens array.

Thus, for the first column, the first set of subpixels corresponding to the point of view number 1 is followed by a set of $M_E \geq 1$ subpixels off (at least one subpixel) then the second set of subpixels on, identical in number to the first, corresponds to the Nth point of view. If N=four points of view, the order of appearance (from top to bottom) of the points of view will be: 1 then 4, then 3, then 2, then 1 again and so on to the bottom of the screen. Between each block of subpixels that are on, there are one or more subpixels off.

The second column of subpixels will be built according to the same principle, but will have to begin with the subpixels of the point of view number 2.

The third column of subpixels will be built according to the same principle, but will have to begin with the subpixels of the point of view number 3.

The fourth column of subpixels will be built according to the same principle, but will have to begin with the subpixels of the point of view number 4.

The fifth column of subpixels will be built according to the same principle, but will have to begin with the subpixels of the point of view number 1 if the set consists of N=4 points of view.

And so on.

This same generic system is also valid regardless of the number of points of view considered, from N=2 to N=9 or more. The quality of the result will depend only on the initial resolution of the screen used. With full HD screens (1080 columns×1920 rows) in the $9/16^{th}$ format, 4 or 5 points of view seem to be a quite acceptable compromise.

According to a first embodiment of the invention, the screen is filled with data originating successively from the different points of view, rows of subpixels after rows of subpixels by inserting one or more rows of "black" subpixels (off or very darkened) at each change of point of view in the direction of the columns. In the direction of the rows, the point of view is changed on each change of column. According to this embodiment, the subpixels displayed on one and the same row correspond to the succession of the points of view in the ascending order from 1 to N in "modulo N" fashion, and the subpixels displayed on one and the same column are separated by at least one non-illuminated subpixel and correspond to the succession of the points of view in the descending order from N to 1 in "modulo N" fashion.

Considered in the direction of the columns, the number of subpixels that are on representing an equivalent set (that is to say that the subpixels displayed originate from one of the points of view and are copied from this point of view by considering a screen of the same size and of the same resolution on which the point of view would be displayed) of subpixels of one of the original points of view taken at the same place, determines the height of the rows that are on separated by the rows that are off, the thickness of which depends on the number of subpixels that are not used. Thus, the angle formed by the lens array will be able to vary as a function of these two associated parameters. Each lens of the optical component has to link together, column after column, the subpixels that are on originating from one and the same point of view. Its angle therefore depends on the distance, in subpixels, to be covered from one column to the next in order to encounter the subpixels corresponding to the same point of view. The more the lines that are on are made up of numerous subpixels, and the more the lines that are off also, the more the axis of the array tends toward the vertical.

FIGS. 2-11 illustrate different variants of this first embodiment. More specifically, FIGS. 2, 3 and 4 correspond to the configurations for 4, 5 and 6 points of view, with columns consisting of blocks of 3 active subpixels for 6 black subpixels with a lens array at α=18.43°. FIGS. 5-11 correspond to 4 points of view, with different sizes of blocks of active and black subpixels, and consequently different values of the angle α.

FIG. 1 illustrates the extreme case, with a single point of view for the entire height of the screen for each column of subpixels, no subpixels that are off and a perfectly vertical lens array. This case does not fall within the scope of the invention.

In a second embodiment of the invention, a second parameter is involved for determining the angle and the pitch of the lens array: the vertical translation. In this embodiment, each column is the subject of a vertical translation (more specifically, it is the pattern formed by the subpixels that are off which is translated vertically, the structure of the display screen can obviously not be changed, so it is the pattern consisting of a subpixels that are on and of subpixels that are off which has to be adapted in the translation. If the pattern is translated by one subpixel downward, the subpixels originating from each of the points of view are chosen one subpixel lower in the original images, the order and the place of the colors having to be strictly observed) in order to adjust the angle of the array, its pitch, and reduce or even cause to disappear the various artifacts described above. Each column of subpixels is constructed on the same principle and sees a succession of alternating subpixels that are on or off. FIGS. 12-37 illustrate different variants of this second embodiment, all with N=4 points of view.

In a third embodiment, different columns have different translations. The order must remain repetitive and regular, and the translation chosen for a set of adjacent columns has to be applied to the subsequent sets in the same way. Circular permutations determine the number of pixels and the number of the original point of view to be used to successively fill all of the screen. Different variants of this embodiment are illustrated in FIGS. 38 to 41.

The point common to all the embodiments consists in switching off, or strongly darkening, a certain number of subpixels in a regular manner between the sets of subpixels corresponding to each of the points of view, column of pixels after column of pixels, and in arranging an optical component (lens array or parallax barrier) obliquely in order to avoid the staircase effect and minimize the pitch of the optical component.

The first embodiment does, however, present a residual drawback due to the fact that the optical axis of the lens array or of the parallax array is oblique and the structure of the pixel is substantially square. These drawbacks are reflected in:

excessively light overlap more effects in the case of superposition of the points of view in the transition between the points of view, or dark moiré effects, in the case of absence of pixels along the oblique axis over a small solid angle corresponding to the inter-pixel space, and/or colored moiré effects, in the case of the systematic appearance of the colored subpixels successively and nonsimultaneously with the change of points of view when the viewer moves parallel to the plane of the screen, over all the screen.

The second and the third embodiments make it possible to avoid or reduce these drawbacks. To adjust the position of the light data necessary to the formation of the points of view, by optimizing the separating power and by reducing or eliminating the brightness moiré effects and the colored moire effects, there are in fact as many entire height pixels as are desired to adjust, to the nearest subpixel, the placement of the three R, G or B components adjacently. The vertical offset downward by one subpixel, by two subpixels or by a much greater value (8 subpixels does not constitute the maximum limit) is particularly advantageous if it is the entire vertical column which is affected.

With no vertical offset of the subpixels, column after column, this basic structure exhibits colored dominants at the transitions between the points of view, because the optical axis is oblique and the structure of the pixel is substantially square. Thus, the optical axis linking the first set of subpixels of the first column (representing information of the point of view 1) with the second set of subpixels of the second column (representing other information of the point of view 1) intersects the red component of the fourth point of view (denoted R4) or the blue component of the second point of view (denoted B2) over all the image, hence a red or blue dominant at the change of point of view, then at the intersection of the green component of the fourth point of view (denoted G4) or of the second point of view (denoted G2) by a dominant R4+G4=yellow or B2+G2=cyan. These colored dominants disappear when the three subpixels are simultaneously intersected by the optical axis.

With a vertical offset of the columns of pixels, the result obtained, column after column, is a circular permutation of the first subpixels encountered by the optical axis when the viewer moves horizontally, which reduces or eliminates the colored dominants. This arrangement also has the advantage of modifying the relative position of the non-lit subpixels which makes it possible to avoid, at least partly, the luminosity moiré effects by balancing the space needed for a good separating power, considered perpendicularly to the optical axis.

By this mechanism, it is possible to use a pitch of the lens array (or of the parallax barrier) less than N times the pixel (N being the number of points of view).

The greater the number of subpixels that are off between each set of subpixels that are on, the more the screen loses its luminosity. This is not, however, very perceptible, particularly if this loss of luminosity is compensated by the use of a high-brightness screen.

The table below summarizes the configurations illustrated by the different figures. "N" is the number of points of view, "α" the angle formed by the optical component relative to the vertical, "subactive" the size of a block of consecutive subpixels used, "sub-black" the size of a block of consecutive subpixels that are off "translation" the vertical translation of the blocks of subpixels that are off (positive: downward, negative: upward).

| FIG. | Embodiment | N | α | Subactive | Sub-black | Translation |
| --- | --- | --- | --- | --- | --- | --- |
| 1 | — | 4 | 0° | 5760 | 0 | 0 |
| 2 | 1 | 4 | 18.43° | 3 | 6 | 0 |
| 3 | 1 | 5 | 18.43° | 3 | 6 | 0 |
| 4 | 1 | 6 | 18.43° | 3 | 6 | 0 |
| 5 | 1 | 4 | 20.56° | 3 | 5 | 0 |
| 6 | 1 | 4 | 16.70° | 3 | 7 | 0 |
| 7 | 1 | 4 | 18.43° | 6 | 3 | 0 |
| 8 | 1 | 4 | 16.70° | 6 | 4 | 0 |
| 9 | 1 | 4 | 15.26° | 6 | 5 | 0 |
| 10 | 1 | 4 | 14.04° | 6 | 6 | 0 |
| 11 | 1 | 4 | 18.43° | 8 | 1 | 0 |
| 12 | 2 | 4 | 18.43° | 6 | 2 | 1 |
| 13 | 2 | 4 | 20.56° | 3 | 4 | 1 |
| 14 | 2 | 4 | 15.26° | 6 | 4 | 1 |
| 15 | 2 | 4 | 16.70° | 3 | 6 | 1 |
| 16 | 2 | 4 | 10.61° | 9 | 6 | 1 |
| 17 | 2 | 4 | 12.09° | 9 | 3 | 2 |
| 18 | 2 | 4 | 14.04° | 6 | 4 | 2 |
| 19 | 2 | 4 | 15.26° | 6 | 3 | 2 |
| 20 | 2 | 4 | 20.56° | 3 | 3 | 2 |
| 21 | 2 | 4 | 16.70° | 3 | 5 | 2 |
| 22 | 2 | 4 | 15.26° | 3 | 6 | 2 |
| 23 | 2 | 4 | 11.31° | 9 | 3 | 3 |
| 24 | 2 | 4 | 14.04° | 6 | 3 | 3 |
| 25 | 2 | 4 | 18.43° | 3 | 3 | 3 |
| 26 | 2 | 4 | 16.70° | 3 | 4 | 3 |
| 27 | 2 | 4 | 15.26° | 3 | 5 | 3 |
| 28 | 2 | 4 | 14.04° | 3 | 6 | 3 |
| 29 | 2 | 4 | 15.26° | 3 | 4 | 4 |
| 30 | 2 | 4 | 14.04° | 3 | 5 | 4 |
| 31 | 2 | 4 | 12.99° | 6 | 3 | 4 |
| 32 | 2 | 4 | 16.70° | 3 | 3 | 4 |
| 33 | 2 | 4 | 18.43° | 3 | 2 | 4 |
| 34 | 2 | 4 | 14.04° | 3 | 4 | 5 |
| 35 | 2 | 4 | 14.04° | 3 | 3 | 6 |
| 36 | 2 | 4 | 10.00° | 8 | 2 | 7 |
| 37 | 2 | 4 | 10.61° | 6 | 2 | 8 |
| 38 | 3 | 4 | 20.56° | 3 | 3 | −1, −1, 0 |
| 39 | 3 | 4 | 20.55° | 3 | 3 | −1, −1, −2 |
| 40 | 3 | 4 | 18.43° | 3 | 6 | −1, 0, +1 |
| 41 | 3 | 4 | 18.43° | 3 | 6 | −1, 1 |

The invention claimed is:

1. A method for autostereoscopic display of an autostereoscopic image, comprising:

loading for display in a screen disposed behind an optical component, an autostereoscopic image with four or more points of view, the points of view comprising individual images acting as different, corresponding views of a common object, the screen presenting a portrait view in which the view has different dimensions, a largest of the dimensions being arranged in a vertical direction and a smallest of the dimensions being arranged in a horizontal direction, the screen presenting the portrait view comprising a multiplicity of pixels arranged in rows and in columns, each of the pixels consisting of a plurality of subpixels of different red, green and blue colors, forming each pixel in said vertical direction in a corresponding one of the columns, displaying all of the points of view in ascending order of a rank of each of the points of view from left to right in a corresponding column of the screen, filling each column of the screen with blocks of at least three subpixels forming a pixel and corresponding to a set of subpixels of one of the points of view of the image to be displayed, and avoiding a staircase effect and minimizing a pitch of the optical component by (1) separating each set of subpixels corresponding to a point of view by blocks of one or more subpixels and (2) introducing between two adjacent columns of said screen a vertical offset of said blocks of one or more subpixels that are darkened, so as to form a row of off or darkened subpixels intersecting the columns, the darkened pixels being arranged so that the darkened pixels form continuous oblique lines across the screen.

2. The autostereoscopic display method as claimed in claim 1, in which said points of view are displayed in an ascending rank order in a direction of the rows, starting from the left of the screen, and in a descending rank order in a direction of the columns, starting from a top of the screen.

3. The autostereoscopic display method as claimed in claim 2, in which each said block of subpixels, corresponding to a set of subpixels of one of the points of view of the image to be displayed, comprises at least six subpixels.

4. The autostereoscopic display method as claimed in claim 2, in which a vertical offset of said blocks of one or more subpixels that are off or darkened is introduced between two adjacent columns of said screen.

5. The autostereoscopic display method as claimed in claim 1, in which each said block of subpixels, corresponding to a set of subpixels of one of the points of view of the image to be displayed, comprises at least six subpixels.

6. The autostereoscopic display method as claimed in claim 5, in which a vertical offset of said blocks of one or more subpixels that are off or darkened is introduced between two adjacent columns of said screen.

7. The autostereoscopic display method as claimed in claim 1, in which a vertical offset of said blocks of one or more subpixels that are off or darkened is introduced between two adjacent columns of said screen.

8. The autostereoscopic display method as claimed in claim 7, in which said vertical offset varies, according to a periodic pattern, from one pair of adjacent columns to another.

9. The autostereoscopic display method as claimed in claim 1, further comprising setting an angle of a lens array of the optical component based upon a number of points of view of the autostereoscopic image and a distance, in subpixels, to be covered from one of the columns to a next one of the columns in order to encounter ones of the subpixels corresponding to a same one of the points of view.

10. The autostereoscopic display method as claimed in claim 1, wherein the row of off or darkened subpixels intersecting the columns is a horizontal row.

11. The autostereoscopic display method as claimed in claim 1, wherein the row of off or darkened subpixels intersecting the columns is a diagonal row.

* * * * *